US011569860B2

(12) United States Patent
Gu (10) Patent No.: US 11,569,860 B2
(45) Date of Patent: Jan. 31, 2023

(54) PLATFORM FOR FITNESS EQUIPMENT

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 27 days.

(21) Appl. No.: 17/349,871

(22) Filed: Jun. 16, 2021

(65) Prior Publication Data

US 2022/0407552 A1 Dec. 22, 2022

(51) Int. Cl.
*H04B 1/3877* (2015.01)
*A63B 71/00* (2006.01)
*A47B 23/06* (2006.01)

(52) U.S. Cl.
CPC ........... *H04B 1/3877* (2013.01); *A47B 23/06* (2013.01); *A63B 71/00* (2013.01); *A63B 2225/685* (2013.01)

(58) Field of Classification Search
CPC ...... H04N 1/3877; A47B 23/06; A47B 23/02; A47B 23/00; A47B 23/025; A63B 71/00; A63B 2225/685
See application file for complete search history.

(56) References Cited

U.S. PATENT DOCUMENTS

| | | | | |
|---|---|---|---|---|
| 6,908,414 B1* | 6/2005 | Roadman | ............... | A63B 22/02 482/8 |
| 7,335,147 B2* | 2/2008 | Jones | ................. | A63B 71/0622 482/148 |
| 10,874,208 B1* | 12/2020 | Knapp | ................... | F16M 11/38 |
| 2006/0258513 A1* | 11/2006 | Routley | ............. | A63B 71/0622 482/54 |
| 2007/0069101 A1* | 3/2007 | Shevin-Sandy | ...... | F16M 11/041 248/441.1 |
| 2008/0314851 A1* | 12/2008 | Jacoby | ................. | A47B 23/001 211/149 |
| 2014/0076206 A1* | 3/2014 | McCabe | ............. | F16M 11/046 108/5 |
| 2014/0080678 A1* | 3/2014 | Wu | ......................... | A63B 22/02 482/54 |
| 2017/0105523 A1* | 4/2017 | McBride | ............ | A63B 22/0605 |
| 2018/0338606 A1* | 11/2018 | Xiang | .................... | A47B 21/02 |
| 2019/0160327 A1* | 5/2019 | Wilson | ................... | A63B 1/005 |
| 2020/0398106 A1* | 12/2020 | Gettle | ................ | A63B 22/0046 |
| 2021/0368976 A1* | 12/2021 | Francis | .............. | A63B 21/4035 |

FOREIGN PATENT DOCUMENTS

| | | | | |
|---|---|---|---|---|
| CN | 208863718 U | * | 5/2019 | |
| WO | WO-2013090800 A2 | * | 6/2013 | ............. A47B 23/00 |

OTHER PUBLICATIONS

English translation of CN 208863718 U (Year: 2022).*

* cited by examiner

*Primary Examiner* — Daniel J Rohrhoff (57) ABSTRACT

A platform is connected to the handle of a fitness equipment and includes a platform and two arms which are pivotably connected to the platform. The two arms are adjustably movable relative to the platform to change the distance between the two arms. The two arms are connected to the handle of the fitness equipment, and the angle of the platform is adjustable such that tablets or electronic devices can be put on the platform when using the fitness equipment.

9 Claims, 11 Drawing Sheets

PLATFORM FOR FITNESS EQUIPMENT

BACKGROUND OF THE INVENTION

1. Fields of the Invention

The present invention relates to a platform for fitness equipment, and more particularly, to an angle adjustable platform connected to a fitness equipment for electronic devices to be put on.

2. Descriptions of Related Art

The conventional fitness equipment such as treadmills, ellipticals and cycles are designed to be operated by the users to train their muscles. Most of the users use electronic devices such as tablets or smart-phones during exercising. However, the fitness equipment does not provide any place for the electronic devices, so that the users put the electronic devices close to the panel of the fitness equipment. The electronic devices cannot be well positioned at that position and may drop off from the panel area by shaking.

The present invention intends to provide a platform for fitness equipment to eliminate shortcomings mentioned above.

SUMMARY OF THE INVENTION

The present invention relates to a platform for being connected to a handle of a fitness equipment, and the platform comprises a platform having a desktop and a pivotal unit which is located at an underside of the platform. The pivotal unit includes a passage defined through the pivotal unit so as to form two end rooms at two ends of the passage, and a path defined in communication between the two end rooms. Two arms are respectively and pivotably connected to the pivotal unit. Each arm has the first end thereof inserted into the end room corresponding thereto so that the arm is movable along the passage. The second end of each arm is connected to a clip assembly which clips to one of two ends of the handle corresponding thereto. The platform is pivotable about the arms by the pivotal unit so as to adjust an angle of the platform.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 5:
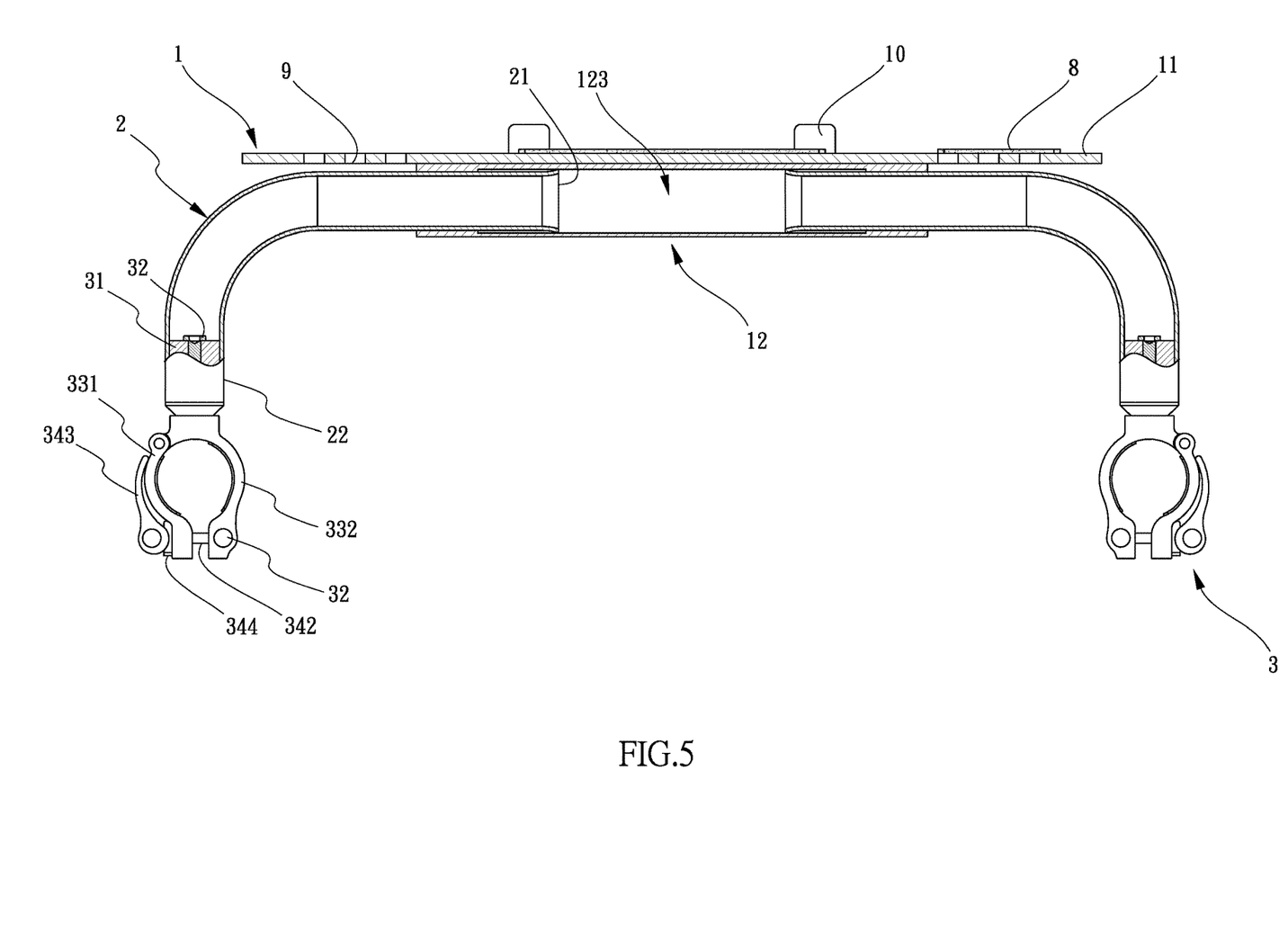
FIG. 5 is a cross sectional view, taken along line V-V in FIG. 1.
Figure 6:
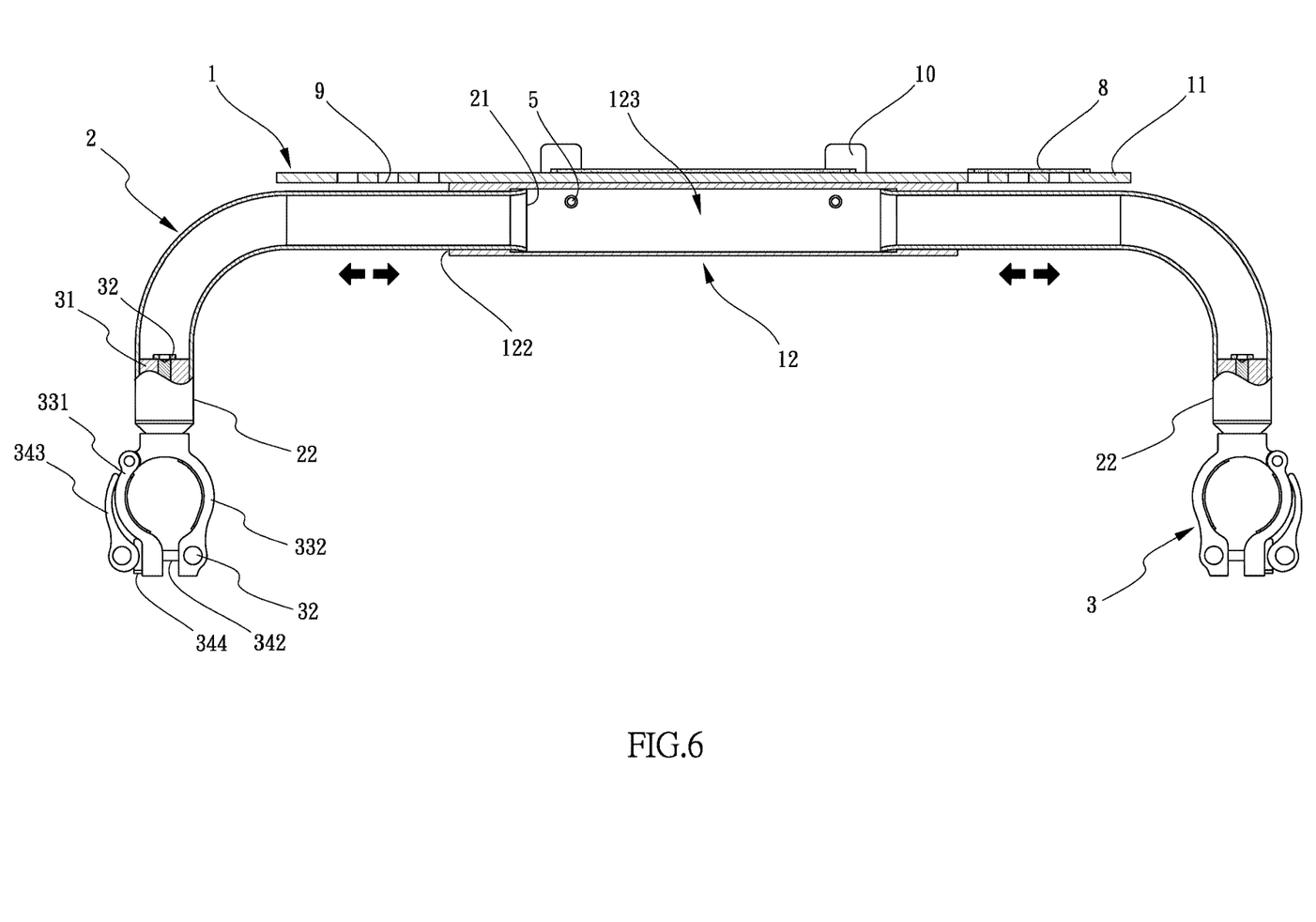
FIG. 6 shows that the two arms are movable along the path of the pivotal unit.

Referring to FIGS. 1 to 11, the platform 1 of the present invention is connected to two ends of the handle 200 of a fitness equipment 100, and comprises a platform 1 having a desktop 11 and a pivotal unit 12 which is located at an underside of the platform 1. The pivotal unit 12 includes a passage 121 defined through the pivotal unit 12 so as to form two end rooms 122 at two ends of the passage 121, and a path 123 is defined in communication between the two end rooms 122. The diameter of each of the two end rooms 122 is smaller than that of the path 123. Two arms 2 each are an L-shaped arm and respectively and pivotably connected to the pivotal unit 123. Each arm 2 has the first end thereof inserted into the end room 122 and the path 123 corresponding thereto so that the arm 2 movable along the passage 121 as shown in FIG. 6 to adjust the distance between the two arms 2. The second end of each arm 2 is connected to a clip assembly 3 which clips to one of two ends of the handle 200 corresponding thereto. The platform 1 is pivotable about the arms 2 by the pivotal unit 12 so as to adjust the angle of the platform 1.

Figure 3:
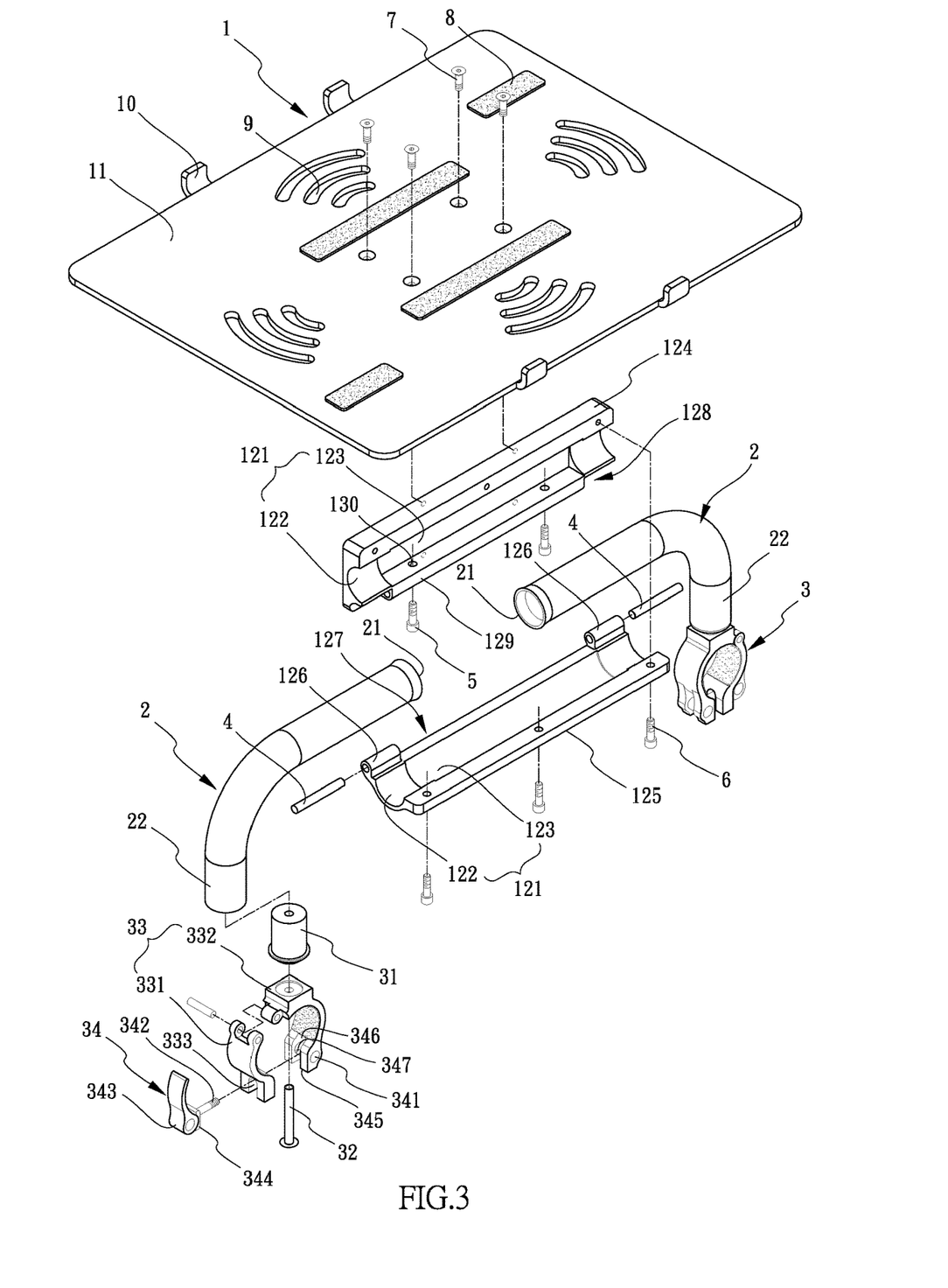
FIG. 3 is an exploded view of the platform and the two arms of the present invention.
Figure 4:
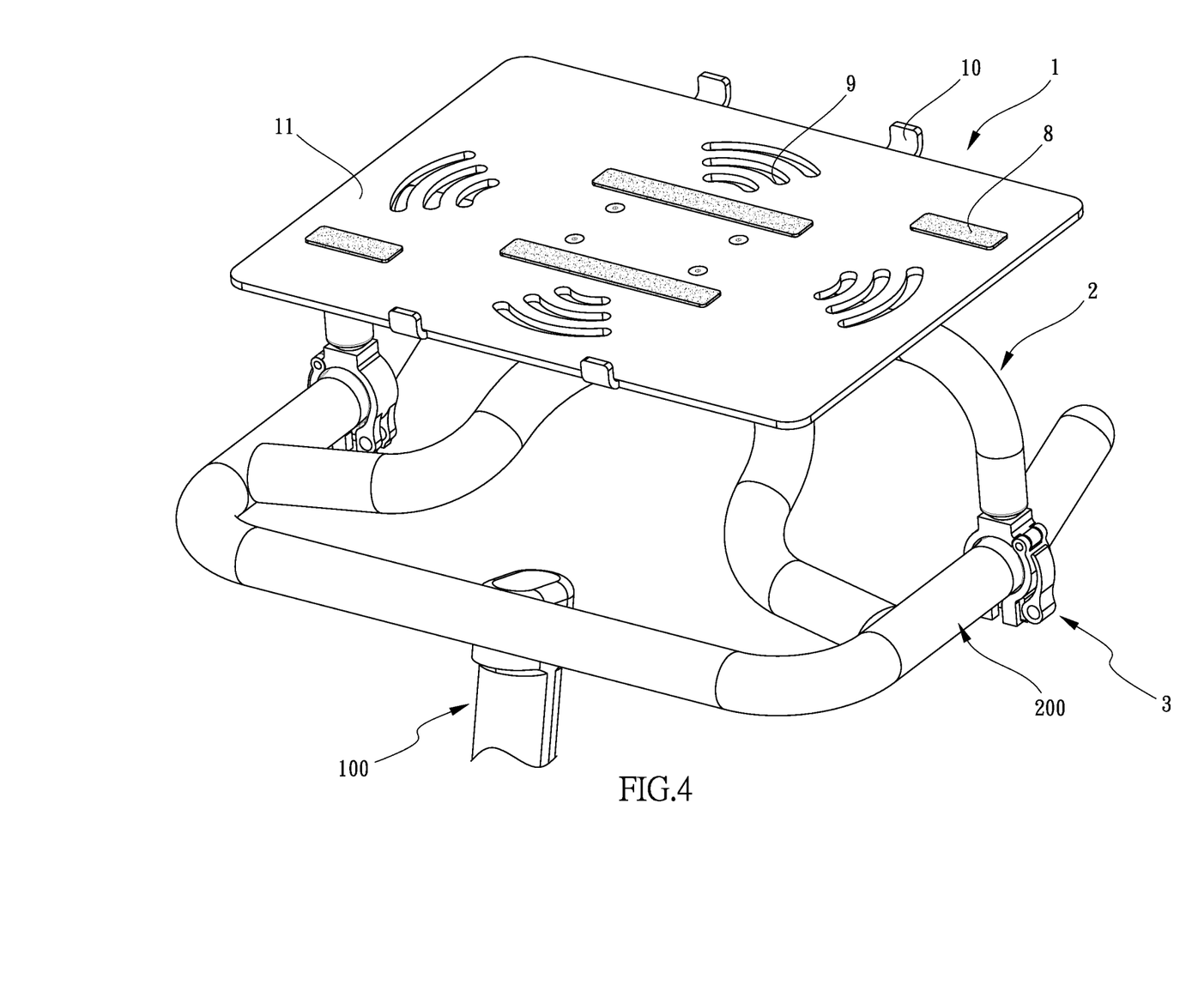
FIG. 4 shows that the platform is connected to the handle of the fitness equipment by the two arms.

As shown in FIG. 3, the pivotal unit 12 includes a first part 124 and a second part 125. The first part 124 is connected to the underside of the platform 1, and the second part 125 is pivotably connected to the first part 124. The second part 125 includes two hinges 126 formed to the first side of the second part 125, and a groove 127 is defined between the two hinges 126. The first part 124 includes two recesses 128 defined in the first side thereof. The two hinges 126 are accommodated in the two recesses 128. The first part 124 includes a ridge 129 formed to the first side thereof, and the ridge 129 is accommodated in the groove 127. Two pins 4 respectively extend through the two hinges 126 and are inserted into two ends of the ridge 129 so that the second part 125 is pivoted about the two pins 4 relative to the first part 124. IN order to secure the two arms 2 to the pivotal unit 12, the first part 124 includes two threaded holes 130 defined through the first side thereof, and the two threaded holes 130 are located corresponding to two ends of the path 123. Two sink bolts 5 respectively threadedly extend through the two threaded holes 130 and extend into the path 123 to contact the two arms 2 to position the arms 2.

Figure 7:
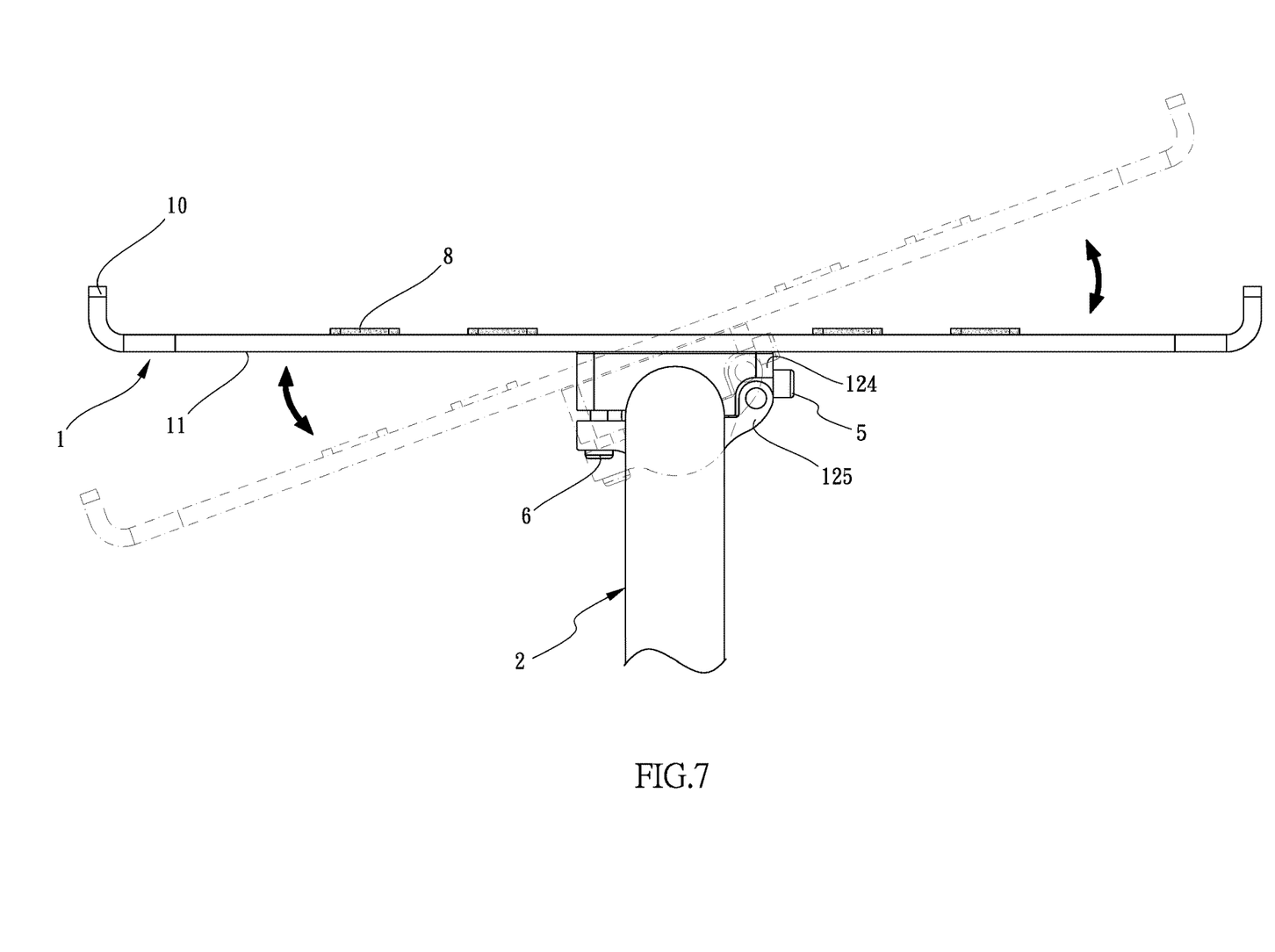
FIG. 7 shows that the angle of the platform is adjusted.

As shown in FIG. 7, the arrow heads show that the angle of the platform 1 is adjusted, and the pivotal action between the first and second parts 124, 125. There are multiple locking members 6 extending the second side of the second part 125 and connected to the second side of the first part 124 to keep the first part 124 and the second part 125 in a closed status so as to clamp the two arms 2. When removing the locking members 6, the second part 125 is pivotable relative to the first part 124 to expose the path 123, such that the two arms 2 can be adjusted or replaced. It is noted that the second side of the first part 124 is not in contact with the second side of the second part 125 when the first part 124 and the second part 125 are in the closed status as shown in FIG. 2.

Figure 2:
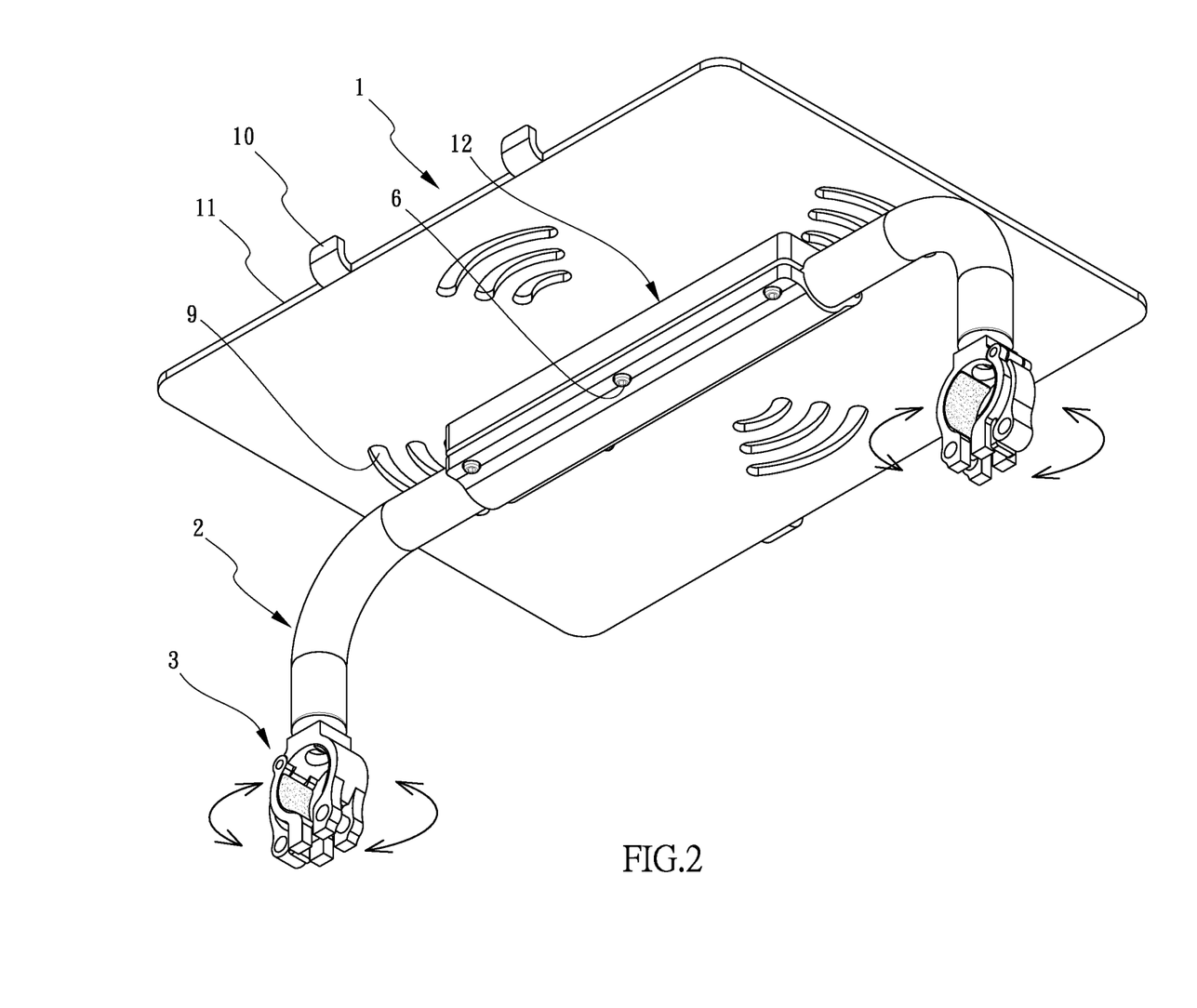
FIG. 2 is another perspective view to show the platform with two arms of the present invention.

As shown in FIGS. 2, 5 and 6, each of the two arms 2 includes a first open end 21 and a second open end 22. The first open end 21 is an enlarged end and located in the path 123. The diameter of the first open end 21 is larger than that of each of the end rooms 122. The first open end 21 is movable in the path 123. The distance is increased when the two respective first open ends 21 are moved away from each other. Because the diameter of the first open end 21 is larger than that of each of the end rooms 122 so that the arms 2 cannot be pulled out axially from the path 123. The second open end 22 is connected to the clip assembly 3 corresponding thereto.

Figure 8:
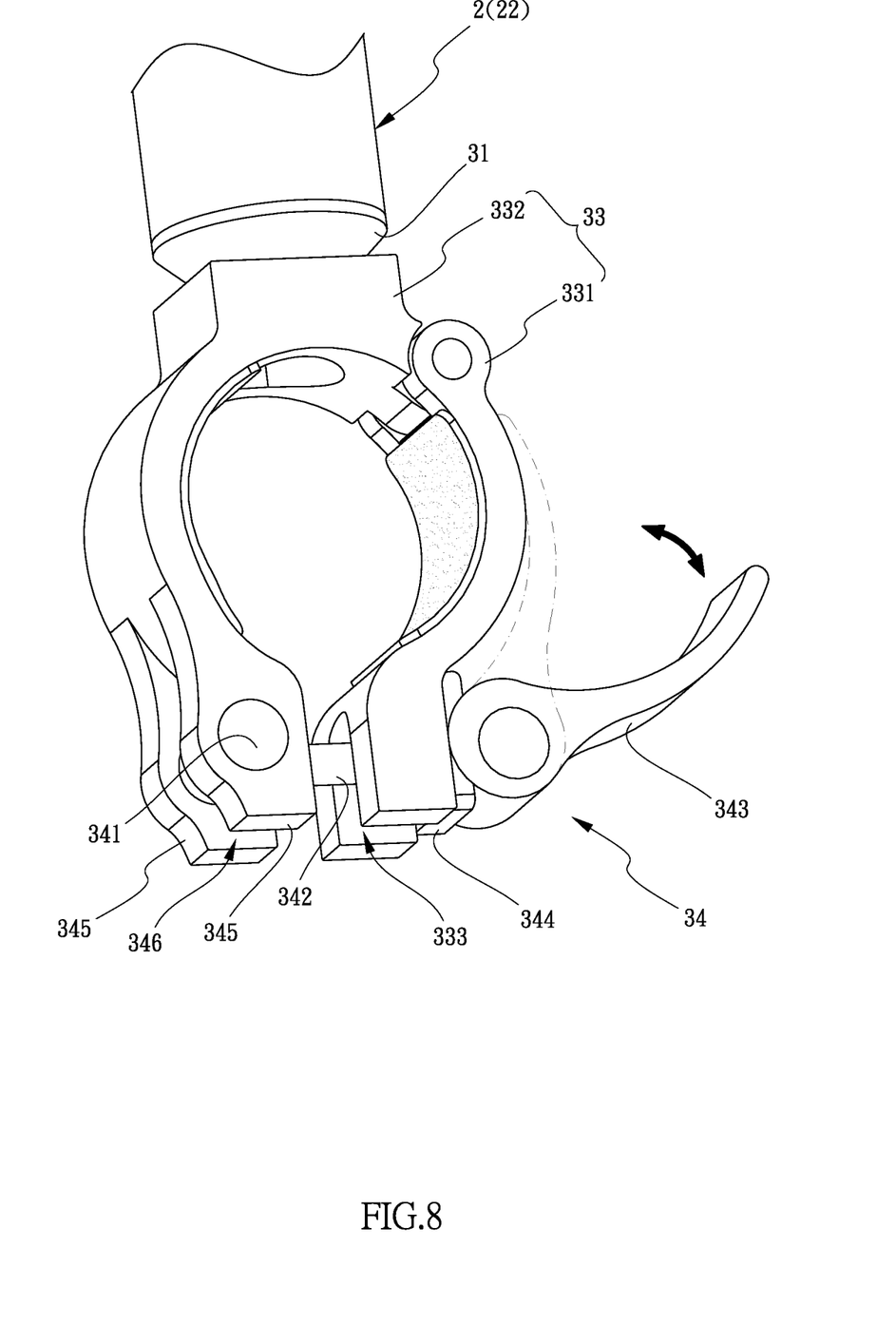
FIG. 8 shows that the lever of the quick-release is pivoted.
Figure 9:
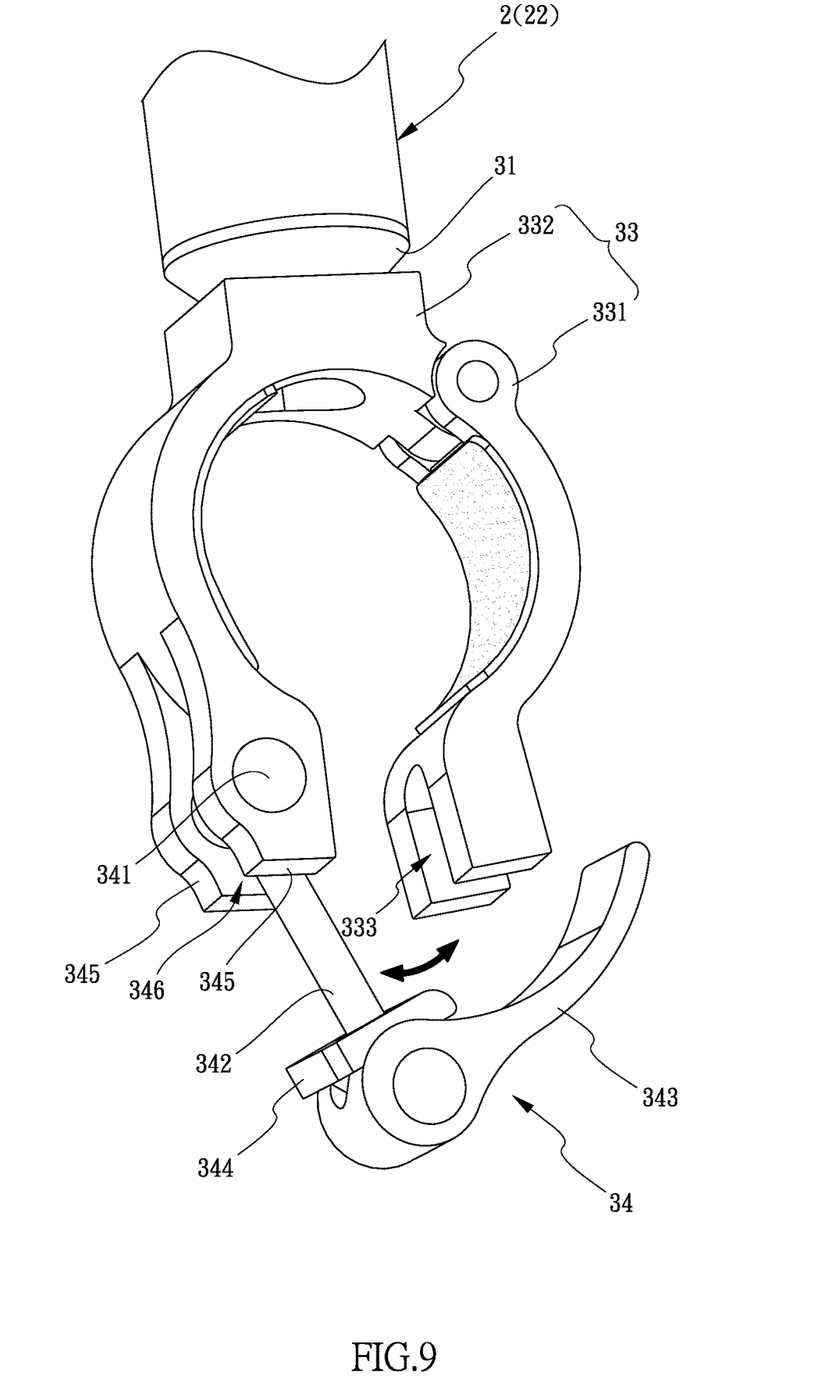
FIG. 9 shows that the quick-release is separated from the second clip portion.
Figure 10:
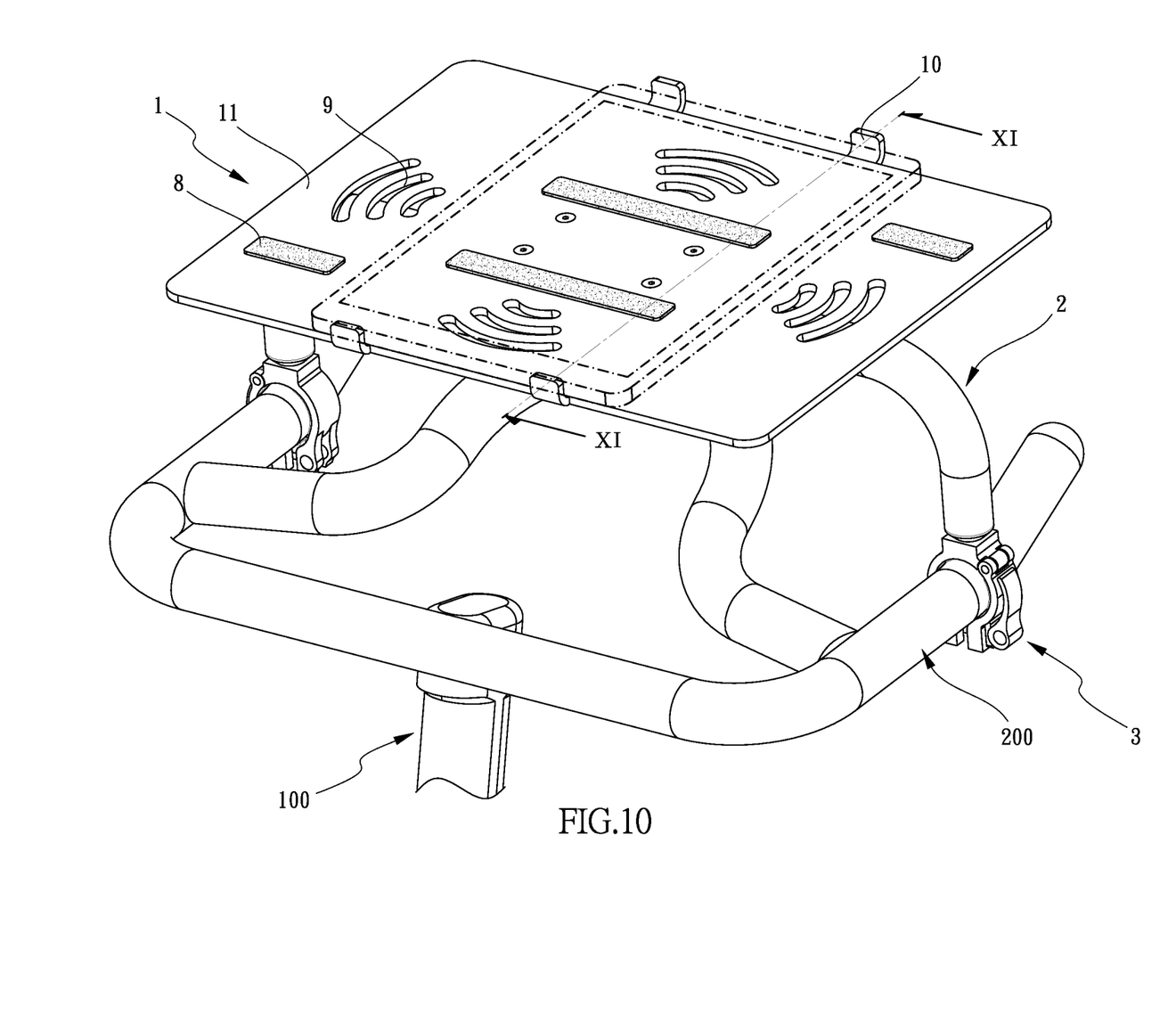
FIG. 10 shows that a tablet is positioned on the platform by the holders.
Figure 11:
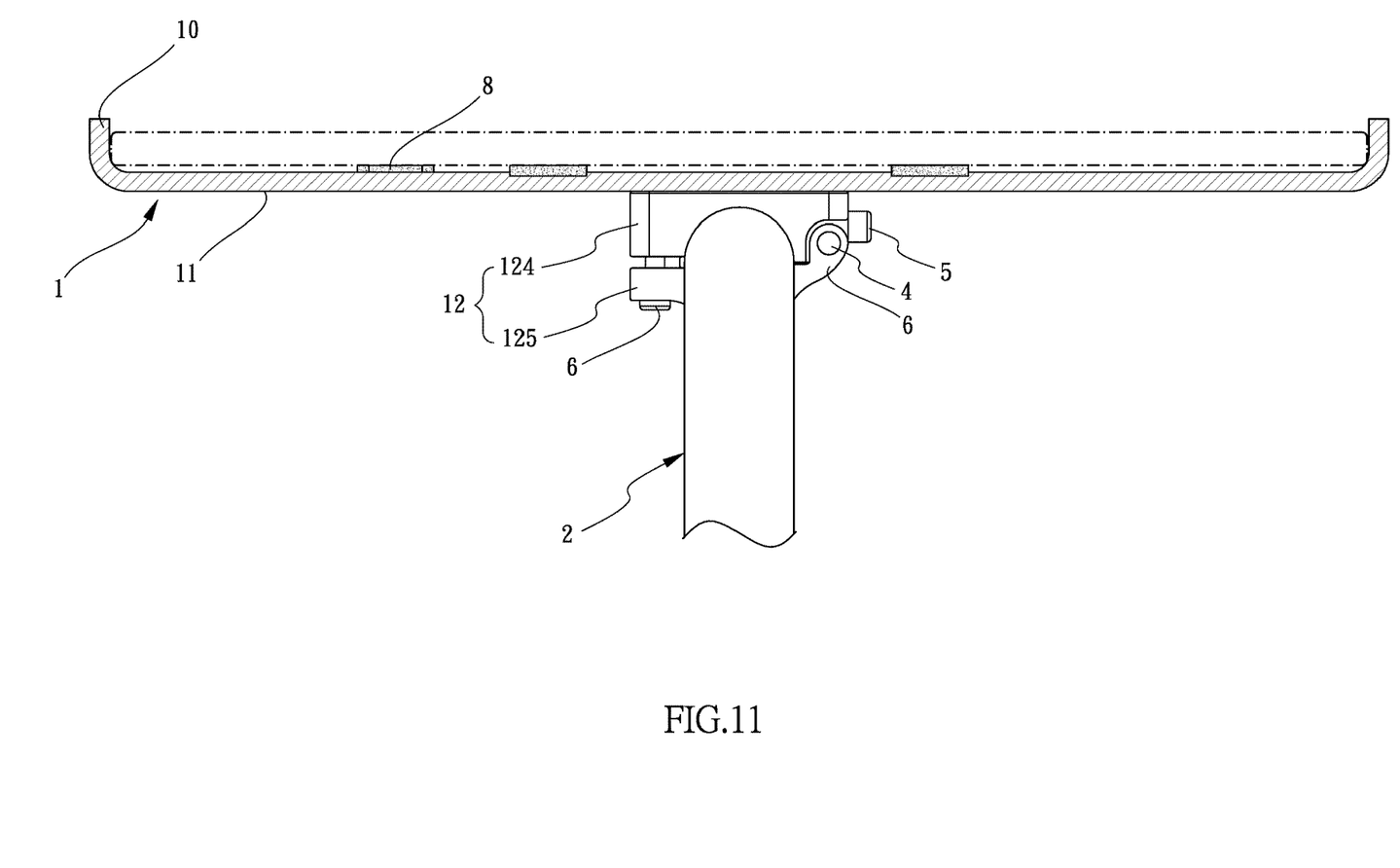
FIG. 11 is a cross sectional view, taken along line XI-XI of FIG. 10.

As shown in FIG. 3, in order to be used to the handles 200 of different shapes, each of the clip assemblies 3 includes a block 31, an axle 32 and a clip unit 33. The first end of the block 31 is securely fitted into the arm 2 corresponding thereto, the clip unit 33 is connected to the second end of the block 31. The axle 32 extends through the clip unit 33 and the block 31. The clip unit 33 is rotated about the axle 32 relative to the block 31. A nut is connected to the distal end of the axle 32 that extends through the block 31 to prevent the axle 32 from dropping from the block 31. Each of the two clip units 33 includes a first clip portion 331, a second clip portion 332 and a quick-release 34. The axle 32 extends through the second clip portion 332 and is connected to the block 31. The first end of the second clip portion 332 is pivotably connected to the first end of the first pivotal portion 331. The first clip portion 331 includes a notch 333 defined through the second end thereof. The quick-release 34 partially extends through the notch 333 and is pivotably connected to the second end of the second clip portion 332, so that the quick-release 34 controls the two respective second ends of the first and second clip portions 331, 332 to be closed to each other or separated from each other. Specifically, each of the two quick-releases 34 includes a pivot 341, a threaded rod 342, a lever 343 and a pad 344. The second end of the second clip portion 332 includes two lugs 345 and a gap 346 formed between the two lugs 345. The pivot 341 is pivotably connected between the two lugs 345 and extends through the gap 346. The pivot 341 includes a threaded hole 347 that is located in the gap 346. The threaded rod 342 has the first end thereof pivotably connected to the lever 343 so that the lever 343 is pivotably connected to the threaded rod 342. The second end of the threaded rod 342 is threadedly connected to the threaded hole 347 of the pivot 341. The pad 344 is mounted to the threaded rod 342. As shown in FIGS. 8 and 9, when the lever 343 is pivoted downward or away from the first end of the first clip portion 331, the two respective second ends of the first and second clip portions 331, 332 are able to be separated from each other, and the threaded rod 342 is able to be removed from the notch 333. Therefore, the handle 200 can be positioned between the first and second clip portions 331, 332. When the handle 200 is located between the first and second clip portions 331, 332, the threaded rod 342 is positioned in the notch 333 again. The lever 343 is pivoted upward or toward the first end of the first clip portion 331, the two respective second ends of the first and second clip portions 331, 332 are closed to each other to clip the handle 200.

Figure 1:
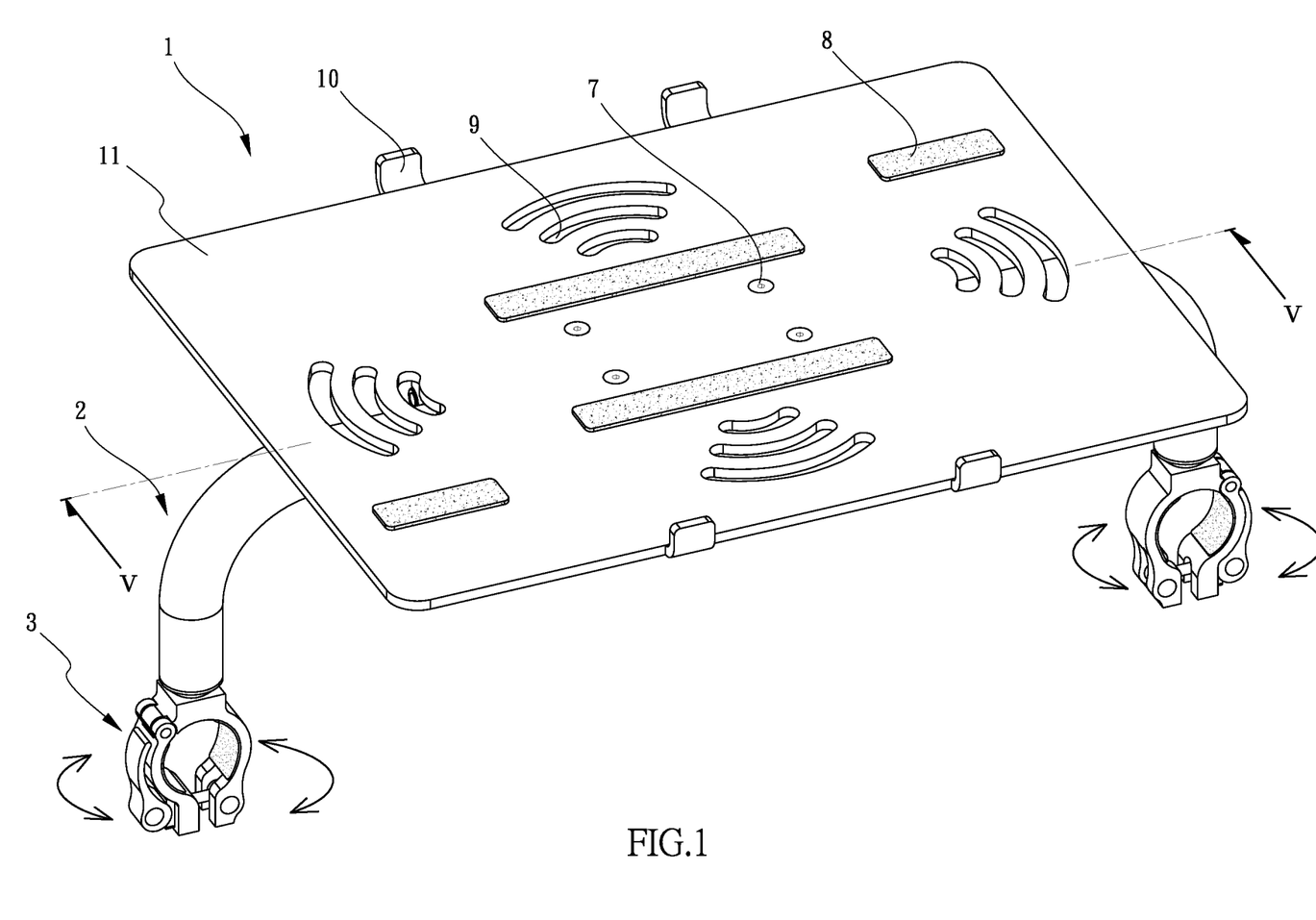
FIG. 1 is a perspective view to show the platform with two arms of the present invention.

As shown in FIGS. 1 and 2, the desktop 11 and the pivotal unit 12 of the platform 1 can be one-piece or two individual portions. In one embodiment, when the desktop 11 and the pivotal unit 12 are two individual portions, multiple screws 7 extend through the desktop 11 and are connected to the pivotal unit 12, the screws 7 do not protrude beyond the top face of the desktop 11. In addition, the platform 1 includes multiple anti-slip strips 8 attached to the top face of the desktop 11, and multiple slots 9 are defined through the desktop 11 of the platform 1. Besides, multiple holders 10 are connected to two opposite sides of the desktop 11, and each holder 10 is bent outward and upward so as to hold a tablet or the like. The holders 10 can be retractable to adjust the size of the electronic device that is held by the holders 10.

While we have shown and described the embodiment in accordance with the present invention, it should be clear to those skilled in the art that further embodiments may be made without departing from the scope of the present invention.

What is claimed is:

1. A platform for fitness equipment (100) which includes a handle (200), comprising:
   a platform (1) having a desktop (11) and a pivotal unit (12) which is located at an underside of the desktop (11) of the platform (1), the pivotal unit (12) including a passage (121) defined through the pivotal unit (12) so as to form two end rooms (122) at two ends of the passage (121), and a path (123) defined in communication between the two end rooms (122), and
   two arms (2) respectively and pivotably connected to the pivotal unit (12), each of the two arms (2) including a first open end (21) and a second open end (22), the first open end (21) being an enlarged end and located in the path (123), a diameter of the first open end (21) being larger than that of each of the end rooms (122) so that the arm (2) is movable along the passage (121), the second open end (22) connected to the clip assembly (3) corresponding thereto which is adapted to clip to one of two ends of the handle (200) corresponding thereto, the desktop (11) of the platform (1) being pivotable about the arms (2) by the pivotal unit (12) so as to adjust an angle of the desktop (11) and the platform (1) relative to the fitness equipment (100).

2. The platform for fitness equipment as claimed in claim 1, wherein the pivotal unit (12) includes a first part (124) and a second part (125), the first part (124) is connected to the platform (1), the second part (125) includes two hinges (126) formed to a first side of the second part (125), and a groove (127) is defined between the two hinges (126), the first part (124) includes two recesses (128) defined in a first side thereof, the two hinges (126) are accommodated in the two recesses (128), the first part (124) includes a ridge (129) formed to the first side thereof, the ridge (129) is accommodated in the groove (127), two pins (4) respectively extend through the two hinges (126) and the pins (4) are inserted into two ends of the ridge (129) so that the second part (125) is pivoted about the two pins (4) relative to the first part (124).

3. The platform for fitness equipment as claimed in claim 2, wherein the first part (124) includes two threaded holes (130) defined through the first side thereof, two sink bolts (5) respectively threadedly extend through the two threaded holes (130) and extend into the path (123) to contact the two arms (2).

4. The platform for fitness equipment as claimed in claim 3 further comprising multiple locking members (6) that extend a second side of the second part (125) and are connected to a second side of the first part (124) to keep the first part (124) and the second part (125) in a closed status so as to clamp the two arms (2), when removing the locking members (6), the second part (125) is pivotable relative to the first part (124) to expose the path (123), the second side of the first part (124) is not in contact with the second side of the second part (125) when the first part (124) and the second part (125) are in the closed status.

5. The platform for fitness equipment as claimed in claim 1, wherein the platform (1) includes multiple anti-slip strips (8) attached to the desktop (11), multiple slots (9) defined through the desktop (11) of the platform (1), multiple holders (10) are connected to two opposite sides of the desktop (11), each holder (10) is bent outward and upward.

6. The platform for fitness equipment as claimed in claim 1, wherein each of the clip assemblies (3) includes a block (31), an axle (32) and a clip unit (33), a first end of the block (31) is securely fitted into the arm (2) corresponding thereto, the clip unit (33) is connected to a second end of the block (31), the axle (32) extends through the clip unit (33) and the block (31).

7. The platform for fitness equipment as claimed in claim 6, wherein each of the two clip units (33) includes a first clip portion (331), a second clip portion (332) and a quick-release (34), the axle (32) extends through the second clip portion (332) and is connected to the block (31), a first end of the second clip portion (332) is pivotably connected to a first end of the first pivotal portion (331), the first clip portion (331) includes a notch (333) defined through a second end thereof, the quick-release (34) partially extends through the notch (333) and is pivotably connected to a second end of the second clip portion (332), so that the quick-release (34) controls the two respective second ends of the first and second clip portions (331, 332) to be closed to each other or separated from each other.

8. The platform for fitness equipment as claimed in claim 7, wherein each of the two quick-releases (34) includes a pivot (341), a threaded rod (342), a lever (343) and a pad (344), the second end of the second clip portion (332) includes two lugs (345) and a gap (346) formed between the two lugs (345), the pivot (341) is pivotably connected between the two lugs (345) and includes a threaded hole (347) that is located in the gap (346), the threaded rod (342) has a first end thereof pivotably connected to the lever (343) so that the lever (343) is pivotably connected to the threaded rod (342), a second end of the threaded rod (342) is threadedly connected to the threaded hole (347) of the pivot (341), the pad (344) is mounted to the threaded rod (342).

9. The platform for fitness equipment as claimed in claim 1, wherein multiple screws (7) extend through the desktop (11) and are connected to the pivotal unit (12), the screws (7) do not protrude from a top face of the desktop (11).

* * * * *